US008693544B2

(12) United States Patent
Lee (10) Patent No.: US 8,693,544 B2
(45) Date of Patent: Apr. 8, 2014

(54) FAST MOTION ESTIMATION APPARATUS AND METHOD BASED ON ADAPTIVE SEARCH RANGE AND PARTIAL MATCHING ERROR

(75) Inventor: SangKeun Lee, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 718 days.

(21) Appl. No.: 12/903,359

(22) Filed: Oct. 13, 2010

(65) Prior Publication Data

US 2011/0103482 A1  May 5, 2011

(30) Foreign Application Priority Data

Nov. 2, 2009  (KR) .................. 10-2009-0104963

(51) Int. Cl.
*H04B 1/66* (2006.01)
(52) U.S. Cl.
USPC ................................... 375/240.16
(58) Field of Classification Search
None
See application file for complete search history.

(56) References Cited

U.S. PATENT DOCUMENTS

2008/0126278 A1* 5/2008 Bronstein et al. ............... 706/17

OTHER PUBLICATIONS

"Fast Motion Estimation based on Adaptive Search Range Adjustment and Matching Error Prediction", by Sangkeun Lee, Consumer Electronics, IEEE Transactions on (vol. 55 , Issue: 2 ) , Date of Publication: May 2009.*

* cited by examiner

*Primary Examiner* — Sath V Perungavoor
*Assistant Examiner* — Dakshesh Parikh
(74) *Attorney, Agent, or Firm* — William Park & Associates Patent Ltd.

(57) ABSTRACT

Provided are fast motion estimation based on adaptive search range and partial matching error. A block dividing unit divides an original block which is set in a first image frame among successive image frames and candidate blocks into a plurality of operation units comprising the same number of pixels, respectively. A matching error calculating unit calculates a partial matching error. A matching error comparing unit replaces an optimal candidate block with a selected candidate block, when a total sum of partial matching errors calculated on all operation units of the candidate block is less than a minimum matching error being the total sum of partial matching errors calculated on all operation units of the optimal candidate block, and a maximum value of the partial matching errors calculated on all the operation units of the selected candidate block is less than a maximum matching error being a maximum value of the partial matching errors calculated on all the operation units of the optimal candidate block.

17 Claims, 4 Drawing Sheets

FAST MOTION ESTIMATION APPARATUS AND METHOD BASED ON ADAPTIVE SEARCH RANGE AND PARTIAL MATCHING ERROR

CROSS-REFERENCE TO RELATED APPLICATION

This application claims priority to Korean Patent Application No. 10-2009-0104963 filed on Nov. 2, 2009 and all the benefits accruing therefrom under 35 U.S.C. §119, the contents of which are incorporated by reference in their entirety.

BACKGROUND

The present disclosure relates to a fast motion estimation apparatus and method based on adaptive search range and partial matching error, and more particularly, to a fast motion estimation apparatus and method, which determine a matching block corresponding to the original block of one image frame from among the candidate blocks of another image frame and estimate a motion vector between two image frames.

Motion Estimation (ME) denotes finding a motion vector on the basis of pixels from one image frame to another image frame. Motion estimation is used for effectively eliminating temporal redundancy and compressing video. Block-based motion estimation techniques including MPEG-x and 11.26x search the most appropriate matching block called the optimal block in a given search range.

A full search algorithm is an optimal block matching technique for finding the most appropriate motion vector, but requires an excessive amount of calculation. Several methods have been proposed which decrease a search range (fast search) or reduce the number of pixels in block matching between the original block and a candidate block for decreasing the calculative complexity of the full search algorithm. That is, motion estimation is largely divided into a search operation and a matching operation. Moreover, each operation is divided into a loss approach and a lossless approach according to whether a coding efficiency is the same or degraded in comparison with the existing full search algorithm.

In a fast search algorithm, a loss algorithm reduces the number of test target points in a given window, and includes three-step search, four-step search and multi-resolution technique. A lossless algorithm includes Successive Elimination Algorithm (SEA), Multi-level SEA (MSEA) and improved MSEA thereof. The SEA removes unnecessary calculation in a block averaging operation, and the MSEA uses a scheme similar to that of the SEA but can remove more calculation. The improved MSEA has been developed by expanding the MSEA for effectively finding ineffective blocks.

In a fast matching algorithm, a loss approach is for reducing calculation on the Sum of Absolute Difference (SAD) of each candidate block. A loss algorithm may be divided into pixel decimation pattern, sub-sampling and sorting-based technique. Recently, a prediction-based algorithm has been proposed, and can save the considerable cost for calculation.

A lossless fast matching approach is a fast processing approach that does not damage the quality of an encoded image, and may be combined with another fast lossless search approach such as the SEA. A Partial Distortion Elimination (PDE) algorithm is an example of fast search. The PDE algorithm scans a given window region by lines from an upper end to a lower end in a raster scheme. In the same scheme, a block matching error, i.e., SAD is calculated by lines even in block matching. By comparing with previously-calculated minimum SAD for each line (for example, sixteen pixels), the elimination of a candidate block is determined. Through such an approach, unnecessary candidate blocks may be eliminated in advance before SAD calculation on all candidate blocks is completed.

Many improved approaches based on PDE have been proposed and show good results. In such approaches, a common operation is one that divides the original block into smaller units (for example, line, sub-block and pixel) to calculate the complexity of each of the units, sorts the calculated complexity in descending power, and compares it with a candidate block for each period (for example, eight pixels or sixteen pixels) in a given window region. However, improved PDE approaches still require a much amount of calculation for the calculation of SAD, and moreover, when a candidate block is similar to the original block but is not the optimal block in the final stage, the improved PDE approaches still require time for removing the candidate block.

Accordingly, even in the case of loss fast motion estimation that causes only the negligible deterioration of quality, it may be a useful means that decreases an amount of calculation necessary for SAD calculation and increases a processing speed in time, and thus the development of a motion estimation technique using it is required.

SUMMARY

The present disclosure provides a fast motion estimation apparatus and method based on adaptive search range and partial matching error, which can adaptively control the size of a search range for finding a motion vector and remove beforehand an undesired candidate block.

The present disclosure also provides a computer-readable storage medium storing a program for executing a fast motion estimation method based on adaptive search range and partial matching error, which can adaptively control the size of a search range for finding a motion vector and remove beforehand an undesired candidate block, in a computer.

According to an exemplary embodiment, a motion estimation apparatus includes: a block dividing unit dividing an original block which is set in a first image frame among a plurality of successive image frames and candidate blocks, which correspond to the original block and are sequentially determined according to a predetermined search direction in a search range which is set in a second image frame intended to estimate a motion between the first image frame and the second image frame, into a plurality of operation units including the same number of pixels, respectively; a matching error calculating unit calculating a partial matching error which is a Sum of Absolute Difference (SAD) of a pixel value with respect to each pixel which configures the operation unit of the same position in the original block for respective operation units of the candidate blocks; a matching error comparing unit replacing an optimal candidate block with a selected candidate block, when a total sum of partial matching errors calculated on all operation units of the candidate block which is sequentially selected from among the candidate blocks is less than a minimum matching error being the total sum of partial matching errors calculated on all operation units of the optimal candidate block, and a maximum value of the partial matching errors calculated on all the operation units of the selected candidate block is less than a maximum matching error being a maximum value of the partial matching errors calculated on all the operation units of the optimal candidate block; and a matching block determining unit determining the optimal candidate block as a matching block for estimating a motion vector from the original block, when partial matching errors are sequentially calculated on all the candidate blocks, wherein a candidate block which is initially set as the optimal candidate block is a candidate block which is selected from among the candidate blocks for the first time.

According to another exemplary embodiment, a motion estimation method includes: dividing an original block which is set in a first image frame among a plurality of successive image frames and candidate blocks, which correspond to the original block and are sequentially determined according to a predetermined search direction in a search range which is set in a second image frame intended to estimate a motion between the first image frame and the second image frame, into a plurality of operation units including the same number of pixels, respectively; calculating a partial matching error which is a Sum of Absolute Difference (SAD) of a pixel value with respect to each pixel which configures the operation unit of the same position in the original block for respective operation units of the candidate blocks; replacing an optimal candidate block with a selected candidate block, when a total sum of partial matching errors calculated on all operation units of the candidate block which is sequentially selected from among the candidate blocks is less than a minimum matching error being the total sum of partial matching errors calculated on all operation units of the optimal candidate block, and a maximum value of the partial matching errors calculated on all the operation units of the selected candidate block is less than a maximum matching error being a maximum value of the partial matching errors calculated on all the operation units of the optimal candidate block; and determining the optimal candidate block as a matching block for estimating a motion vector from the original block, when partial matching errors are sequentially calculated on all the candidate blocks, wherein a candidate block which is initially set as the optimal candidate block is a candidate block which is selected from among the candidate blocks for the first time.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, specific embodiments of a fast motion estimation apparatus and method based on adaptive search range and partial matching error will be described in detail with reference to the accompanying drawings.

Figure 1:
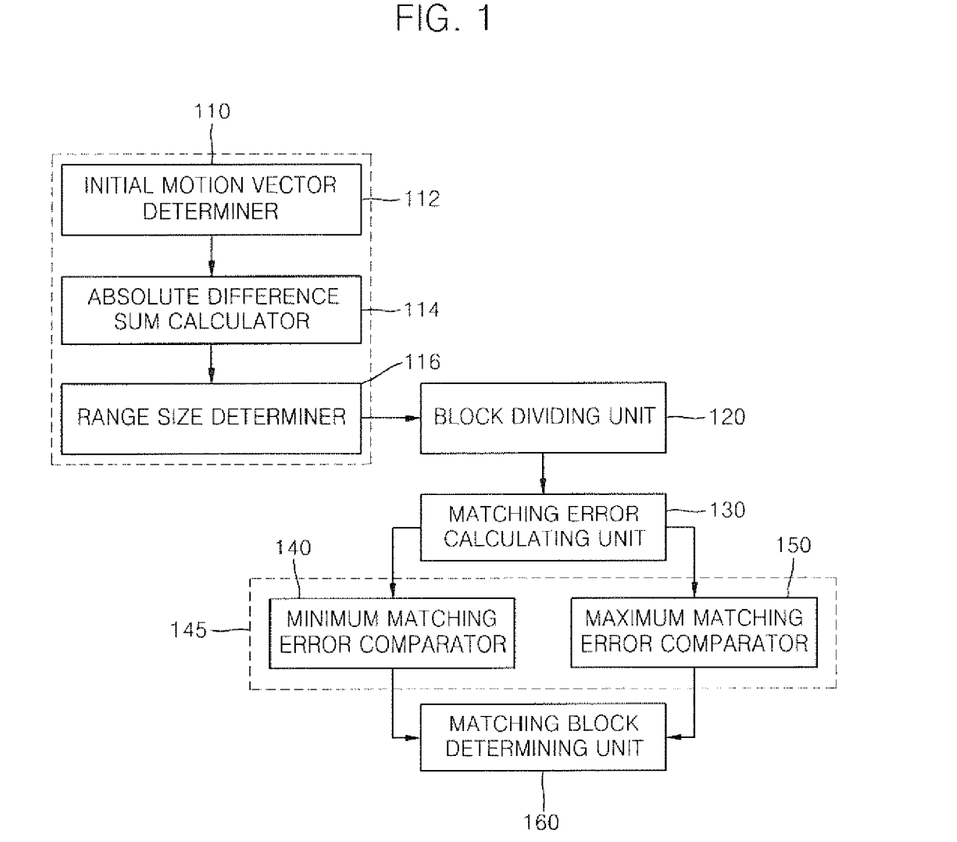
FIG. 1 is a block diagram illustrating a fast motion estimation apparatus and method based on adaptive search range and partial matching error according to an exemplary embodiment.

FIG. 1 is a block diagram illustrating a fast motion estimation apparatus and method based on adaptive search range and partial matching error according to an exemplary embodiment.

Referring to FIG. 1, a fast motion estimation apparatus according to an exemplary embodiment includes a search range setting unit 110, a block dividing unit 120, a matching error calculating unit 130, a matching error comparing unit 145, and a matching block determining unit 160.

The search range setting unit 110 sets a search range in a second image frame intended to estimate the motion of a first image frame, for finding a matching block corresponding to the original block that is set in the first image frame among a plurality of successive image frames. For this, the search range setting unit 110 includes an initial motion vector determiner 112, an absolute difference sum calculator 114, and a range size determiner 116.

The initial motion vector determiner 112 determines the median vector of vectors from the original block to neighboring blocks adjacent to the original block.

In the related art, a search range for determining a matching block in the second image frame is set as a range having a certain size around a position corresponding to the original block. However, as a corresponding position becomes closer to the edge of the search range, i.e., as the corresponding position becomes farther away from a position corresponding to the original block, the possibility that a matching block may be determined in the corresponding position becomes lower. Accordingly, by appropriately controlling the size of the search range, an amount of calculation for finding the matching block can be reduced.

The search range setting unit 110 uses an adaptive search range control technique based on spatial correlation with adjacent blocks for decreasing the size of a search range. The optimally-controlled search range denotes a small range peripheral to the optimal motion vector from the original block to a matching block. However, the information of the optimal motion vector cannot be obtained before full search is completed in the second image frame on the original block. Therefore, the initial motion vector "$mv_0$" for the original block is expressed as Equation (1) below by applying a median operator to motion vectors "$mv_\omega = [mv_l \ mv_u mv_{ul}]$" from the original block to neighboring blocks adjacent to the original block (for example, toward the left, the top and the left top).

$$mv_0 = \text{media}\{mv_\omega\} \qquad (1)$$

Subsequently, the absolute difference sum calculator 114 calculates a Sum of Absolute Difference (SAD) of a pixel value with respect to each pixel configuring the original block for the initial candidate block of a position that is moved by the initial motion vector from a position corresponding to the original block and neighboring candidate blocks adjacent to the initial candidate block, in the second image frame.

An adaptive search range set by the search range setting unit 110 is controlled by reflecting the matching characteristic of neighboring blocks. The block matching error in a specific range is because of large correlation. A set of a sum of absolute difference "$SAD_c$" with respect to the original block for the initial candidate block of a position that is moved by the initial motion vector "$mv_0$" from a position corresponding to the original block and an SAD with respect to three neighboring blocks adjacent to the initial candidate block is "$C = [SAD_c, SAD_l \ DAD_u \ DAD_{ul}]$". Among this, a selected SAD value is used to determine a search range in the second image frame. Such SADs represent an error between the original block and a candidate block.

The range size determiner 116 determines the size of a search range in the second image frame on the basis of the maximum value of SADs that are respectively calculated on the initial candidate block and neighboring candidate blocks.

That is, the maximum SAD value of the set "C=[SAD$_c$ SAD$_l$ DAD$_u$ DAD$_{ul}$]" is used to determine the size of the search range.

The size of an adaptive search range 'D' is determined through Equation (2) below by using the maximum value of the set "C".

$$D = f(\max(C)) \tag{2}$$

where a function "f(•)" of determining the size of the search range is defined as Equation (3) below.

$$f(\chi) = \max\left(0, \min\left(R, \text{round}\left(\frac{R \cdot \chi}{T_{SAD}}\right)\right)\right) \tag{3}$$

where round (•) is a function of changing the closest integer value, R is the size of a search range "R=[−R R] that is initially set, and $T_{SAD}$ is a reference value for linearly controlling a search range on the basis of the matching error of a neighboring candidate block.

Figure 2:
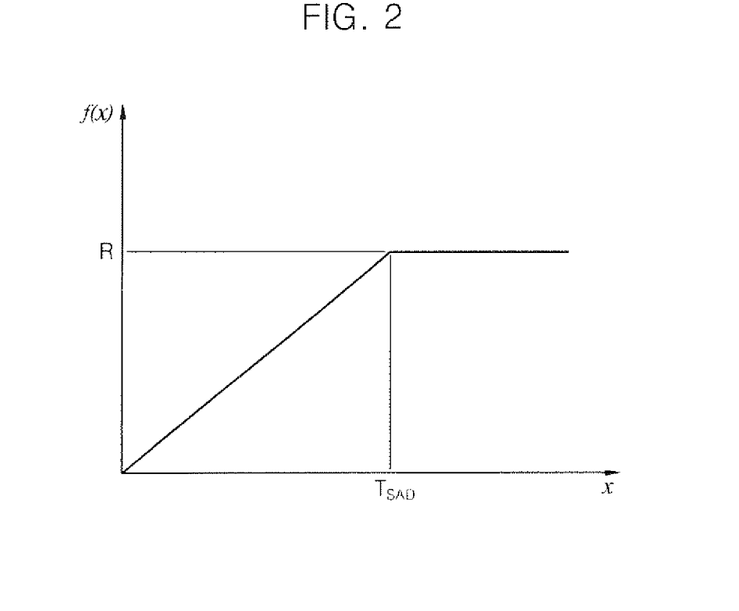
FIG. 2 is a graph showing a size of a search range which is controlled based on the maximum sum of absolute difference.

FIG. 2 is a graph showing a size of a search range which is controlled based on the maximum SAD.

Referring to FIG. 2, it can be seen that as the maximum SAD of the set "C" increases, the controlled size of a search range becomes closer to the size "R." of a search range that is initially set. In a case of actually applying the fast motion estimation apparatus according to an exemplary embodiment, the maximum SAD value inserted into the function "f(•)" is divided into block sizes for normalization.

Selecting the maximum value of SADs, which are calculated on the initial candidate block and neighboring candidate blocks for determining the size of a search range, decreases a risk that may occur by the search range being unsuitably controlled in a boundary peripheral range with objects having different motion directions. In such a boundary range, an SAD, i.e., a matching error with respect to the original block shows a high value. This is because a motion vector corresponding to the original block is required to be found in a fundamentally-set search range.

Moreover, when the value of max (C) is 0, the size of a search range "D" is 0. This is very effective for a stop scene. Therefore, motion estimation is performed only in a new search range around a point that is moved by the initial motion vector "mv$_0$" from a position corresponding to the original block.

The block dividing unit 120 divides the original block that is set in the first image frame and candidate blocks, which correspond to the original block and are sequentially determined according to a predetermined search direction in a search range set in the second image frame, into a plurality of operation units composed of the same number of pixels. Herein, the operation unit may be one block or one line.

When the total pixels of a block are used for calculating the SAD between the original block of the first image frame and the candidate block of the second image frame, i.e., a matching error, an amount of calculation may increase and a motion estimation speed may become lower. Accordingly, the block dividing unit 120 may divide the original block and the candidate block into operation units having the same size and calculate matching errors by operation unit between the original block and the candidate block.

As an example of block division, when the size of the original block and the size of a candidate block are 16×16 the original block and the candidate block may be respectively divided into unit blocks having 4×4 size, and each unit block may be an operation unit. When the size of the unit block decreases, the calculation of a matching error has no meaning. When the size of the unit block increases excessively, an amount of calculation becomes higher, and thus the division of a block has no meaning. Therefore, the size of the unit block may be appropriately determined according to the size of the original block and the size of the candidate block.

The matching error calculating unit 130 calculates a partial snatching error which is an SAD of a pixel value with respect to each pixel which configures the operation unit of the same position in the original block for respective operation units that are generated from respective candidate blocks.

When sequentially calculating partial matching errors between the candidate blocks of a search range and the original block by operation unit, the matching error calculating unit 130 may calculate the partial matching errors between the candidate block and the original block by line from a point corresponding to the vertex of the search range. However, the search range is around a point corresponding to the position of the original block, and there is much possibility that an SAD between the original block and a candidate block disposed at a corresponding point may be less than another candidate block. The matching error calculating unit 130 may sequentially calculate SADs with respect to the original block according to a spiral search direction from the center of a search range corresponding to the position of the original block to the edge of the search range.

A motion estimation operation for the original block having N×N size, which is disposed at an arbitrary point "p=[p$_x$, p$_y$]$^T$" in the first image frame, is to find a matching block that is disposed at a motion vector "mv=[mv$_x$, mv$_y$]$^T$" in the search range of the second image frame. The motion estimation operation is performed using the minimum SAD through Equation (4) below.

$$\text{SAD}(p, mv') = {}_{mv \in R}^{\min} \text{SAD}(p, mv) \tag{4}$$

where mv' is the optimal motion vector in a search range "R", and SAD is expressed as Equation (5).

$$\text{SAD}(p, mv) = \tag{5}$$
$$\sum_{i=0}^{N-1} \sum_{j=0}^{N-1} |f_t(i + p_x, j + p_y) - f_{t-1}(i + p_x + mv_x, j + p_y + mv_y)| =$$
$$\sum_{i=0}^{N-1} \sum_{j=0}^{N-1} |f_t^p(i, j) - f_{t-1}^{p+mv}(i, j)|$$

where $f_t$ represents the first image frame, and $f_{t-1}$ represents the second image frame.

For calculating a matching error with respect to the original block, as described above, a partial matching error is calculated based on an operation unit which is generated by dividing a block, without using all blocks. Therefore, a matching block corresponding to the original block is determined according to a partial matching error that is calculated on the basis of a pixel value difference between pixels configuring one operation unit by modifying Equations (4) and (5).

A candidate block disposed at the center of a search range, i.e., the foremost initial candidate block among sequentially-determined candidate blocks, is determined as the optimal candidate block according to a spiral search direction, and the matching error calculation unit 130 calculates a partial matching error which is an SAD with respect to a candidate block on the each operation unit of the initial candidate block. Therefore, the total sum of partial matching errors that are calculated on the operation unit of the initial candidate block is determined as the initial value of the minimum matching error. Subsequently, when the total sum of partial matching errors calculated on a candidate block according to a search direction is less than the minimum matching error, a corresponding candidate block is determined as a new optimal candidate block, and the minimum matching error is updated. The update of the optimal candidate block and the update of the minimum matching error are performed by the matching error comparing unit 145.

The initial value of the minimum matching error is determined, and then the matching error calculating unit 130 sequentially calculates partial matching errors on the operation units of respective candidate blocks according to a search direction. A partial matching error that has been accumulated to the kth operation unit of the candidate block is defined as Equation (6) below.

$$aSAD^K(p, P(mv)) = \sum_{i=0}^{N-1} \sum_{j=0}^{N-1} |f_t^P(i, j) - f_{t-1}^{p+p(mv)}(i, j)|$$

$$= \sum_{k=0}^{K} pSAD^k(p, P(mv))$$

(6)

where P(mv) is the position of a candidate block, and pSAD$^k$ is a partial matching error that is calculated on the kth operation unit of the candidate block.

When a partial matching error accumulated as expressed in Equation (6) is calculated on all candidate blocks according to a search direction, a matching block corresponding to the original block is determined as expressed in Equation (7) below.

$$SAD(p, mv') = {}_{mv \in R}^{min} \alpha SAD^{n-1}(p, P(mv))$$ (7)

where n is the number of operation units configuring one candidate block.

A candidate block, where the total sum of partial matching errors that are calculated between respective operation units of the original block is the minimum, i.e., a candidate block having the minimum matching error is determined as a matching block, as expressed in Equation (7). However, the optimal candidate block is updated each time a partial matching error is calculated on each candidate block, the optimal candidate block is determined as a matching block as soon as an operation is ended on all candidate blocks. Also, a motion vector from the original block to the matching block is determined as the optimal motion vector representing a motion between the first and second image frames.

Furthermore, the matching error comparing unit 145 compares a partial matching error calculated on each operation unit of a candidate block with the maximum matching error being the maximum value among partial matching errors that are calculated on the operation units of the optimal candidate block. That is, when the accumulated sum of partial matching errors calculated on all the operation units of a candidate block is less than the minimum matching error being the total sum of partial matching errors calculated on all the operation units of the optimal candidate block and the maximum value of the partial matching errors calculated on all the operation units of the candidate block is less than the maximum matching error being the maximum value of the partial matching errors calculated on all the operation units of the optimal candidate block, the matching error comparing unit 145 determines a corresponding candidate block as the optimal candidate block. The determined optimal candidate block is compared with a partial matching error that is calculated on sequentially-succeeded candidate blocks.

However, in a case of calculating a partial matching error on a specific candidate block, there is no possibility that a corresponding candidate block may be determined as a matching block when an accumulated sum up to a kth operation unit is greater than the minimum matching error. Nevertheless, by continuously calculating partial matching errors on operation units succeeding the kth operation unit in the corresponding candidate block, an amount of calculation increases, and the speed of motion estimation becomes lower.

In this way, therefore, by determining beforehand a candidate block having no possibility to be determined as a matching block and excluding the determined block from a motion estimation operation, an operation of calculating an additional partial matching error may be ended on a corresponding candidate block. For this, the matching error comparing unit 145 includes a minimum matching error comparator 140 and a maximum matching error comparator 150.

When the accumulated sum of partial matching errors that are sequentially calculated on operation units generated from a candidate block is greater than the minimum matching error, the minimum matching error comparator 140 calculates a partial matching error on the operation units of sequentially-succeeded candidate blocks.

Determining a candidate block to be excluded is performed on the basis of the accumulated sum of sequentially-calculated partial matching errors and partial matching errors calculated on the each operation unit of the candidate block. The minimum matching error comparator 140 compares the accumulated sum of the partial matching errors with the minimum matching error and determines whether to exclude a candidate block.

As described above, the minimum matching error is updated when a corresponding candidate block is determined as the optimal candidate block each time a partial matching error is calculated on all the operation units of each candidate block. This is expressed as Equation (8) below.

$$SAD_{min} = \sum_{k=0}^{n-1} pSAD^k(p, mv')$$ (8)

where SAD$_{min}$ is the minimum matching error, n is the number of operation units included in a candidate block, pSAD$^k$ is a partial matching error that is calculated on the kth operation unit of n operation units, and mv' is the position of the optimal candidate block.

The minimum matching error comparator 140 compares the accumulated sum of partial matching errors with the minimum matching error each time partial matching errors are sequentially calculated on the operation units of a candidate block. When the compared result shows that the accumulated sum of partial matching errors is greater than the minimum matching error, the calculation of a partial matching error is not required on successive operation units since there is no possibility that a corresponding candidate block may be determined as the optimal candidate block or a matching block.

Therefore, the minimum matching error comparator 140 calculates partial matching errors of the respective operation units of sequentially-succeeded candidate blocks according to a search direction. However, when the accumulated sum of partial matching errors is less than the minimum matching error, the matching error calculating unit 130 continuously calculates the minimum matching error on successive operation units.

Moreover, as described above, when partial matching errors are calculated on all the operation units of a candidate block and the total sum of partial matching errors of all the operation units is less than the minimum matching error, a corresponding candidate block is determined as the optimal candidate block, and the total sum of partial matching errors is determined as a new minimum matching error.

When partial matching errors sequentially calculated on the operation units of a candidate block are greater than the maximum matching error, the maximum matching error comparator 150 calculates partial matching errors on the operation units of sequentially-succeeded candidate blocks.

The minimum matching error comparator 140 has determined above whether to exclude a candidate block by using the accumulated sum of partial matching errors sequentially calculated on the candidate block. On the other hand, the maximum matching error comparator 150 determines whether to exclude a candidate block by using respective partial matching errors that are sequentially calculated on the operation units of the candidate block.

The maximum matching error compared with a partial matching error calculated on each operation unit is the maximum value of partial matching errors calculated on the optimal candidate block, and is expressed as Equation (9) below.

$$pSAD_{max} = {}_{k \in S}^{max}(pSAD^k(p, mv')) \qquad (9)$$

where $S=\{0, \ldots, n-1\}$ is a set of all operation units in a block, and mv' is the position of the optimal candidate block.

The maximum matching error does not require an additional calculation operation, and is calculated together with the minimum matching error simultaneously with the determination of the optimal candidate block. Also, partial matching errors that are calculated on respective operation units in a candidate block are added to the accumulated sum of previously-calculated partial matching errors, and are compared with the minimum matching error by the minimum matching error comparator 140 and simultaneously are compared with the maximum matching error separately. Accordingly, time taken in motion estimation is not extended or an amount of calculation does not increase.

When partial matching errors that are sequentially calculated on respective operation units of a candidate block are greater than the maximum matching error, the maximum matching error comparator 150 determines a corresponding candidate block as having no possibility to be determined as the optimal candidate block or a matching block and ends an operation of calculating partial matching errors on operation units. The matching error calculating unit 130 calculates partial matching errors on the operation units of candidate blocks sequentially succeeding a corresponding candidate block.

As described above, when partial matching errors are calculated on all the operation units of a candidate block and the total sum of all the partial matching errors is less than the minimum matching error, a corresponding candidate block is determined as the optimal candidate block. The matching error comparing unit 145 determines a corresponding candidate block as the optimal candidate block and determines the maximum value of partial matching errors calculated on the operation units of a candidate block as a new maximum matching error. That is, a partial matching error is calculated on the entirety of one candidate block, and thereafter the minimum matching error and the maximum matching error are updated and used as a criterion for determining whether to exclude successive candidate blocks.

According to an exemplary embodiment, in this way, the maximum matching error is used when determining whether to exclude a candidate block from a motion estimation operation, the reliability of the maximum matching error is important. Since the maximum matching error is a value that is calculated from one operation unit, an operation unit is required to reflect the information of total blocks for having a reliable value. Therefore, the information of total blocks being included in one operation unit is more preferred than determining an operation unit through a scheme of simply dividing the original block and a candidate block.

In an exemplary embodiment, therefore, when dividing the original block and a candidate block to generate operation units, the fast motion estimation apparatus first divides the original block and the candidate block into a plurality of unit blocks having the same size, and configures a sub-block being one operation unit with pixels corresponding to the same position in each block unit.

Figure 3:
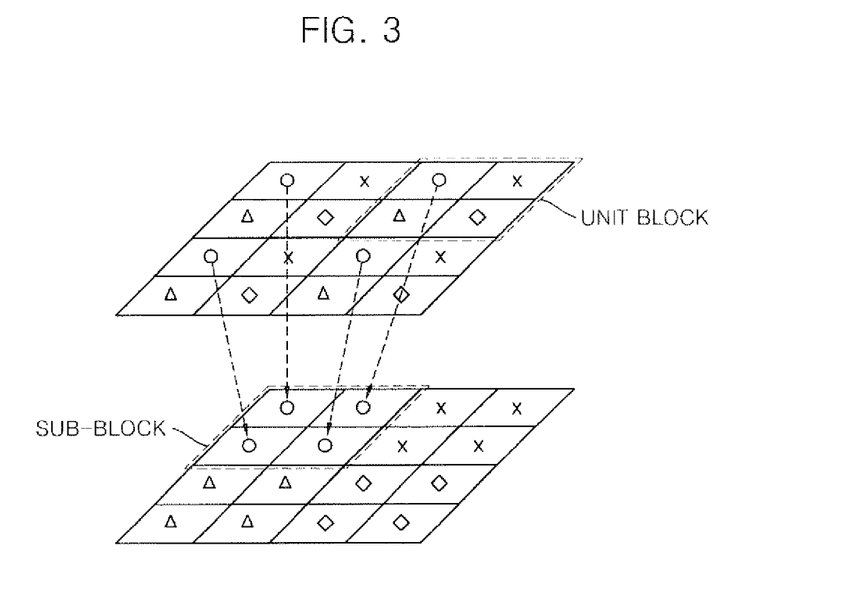
FIG. 3 is a diagram illustrating an example of a sub-block used as an operation unit.

FIG. 3 is a diagram illustrating an example of a sub-block used as an operation unit.

Referring to FIG. 3, the original block or a candidate block having 4×4 size is first divided into four unit blocks having 2×2 size, and four pixels corresponding to the same position in each unit block configures one sub-block. For example, pixels "○" corresponding to a position (0,0) are selected from each unit block and thereby configure one sub-block. In this way, when generating an operation unit through the realignment of pixels, reliability for the maximum matching error based on one operation unit and motion estimation based on it increases. This may be identically applied even when the size of the original block and the size of a candidate block are 16×16 and the size of a sub-block is 4×4.

In this way, in the case of a sub-block where the size of an operation unit is 2×2, the accumulated sum of partial matching errors based on the sub-block may be expressed as Equation (10) below in a candidate block.

$$aSAD^K(p, P(mv)) = \qquad (10)$$

$$\sum_{i,j=0}^{K=i+4j} \sum_{u,v=0}^{M} |f_t^p(i+4u, j+4v) - f_{t-1}^{p+P(mv)}(i+4u, j+4v)|$$

$$\text{for } 0 \le K \le n-1$$

where $\alpha SAD^K(p, P(mv))$ is the kth operation unit of a candidate block, i.e., the accumulated sum $$M = \frac{N}{4} - 1$$

of partial matching errors up to a sub-block, and i and j indicates the start point of a realigned sub-block for $0 \le i$ and $j \le M$.

Since the position of each pixel may be determined in advance, an additional operation for matching based on realignment is not required. In a candidate block, when k=i+4j, a partial matching error on each sub-block is expressed as Equation (11) below.

$$aSAD^K(p, P(mv)) = \sum_{u,v=0}^{M} \left| f_t^p(i+4u, j+4v) - f_{t-1}^{p+P(mv)}(i+4u, j+4v) \right| \quad (11)$$

where $aSAD^K(p,P(mv))$ is a partial matching error on the kth sub-block of a candidate block.

Finally, when partial matching errors are sequentially calculated on all candidate blocks, the matching block determining unit 160 determines the optimal candidate block as a matching block for estimating a motion vector from the original block.

When an operation of sequentially calculating partial matching errors from the initial candidate block to the final candidate block according to a search direction, an operation of comparing the minimum matching error and the maximum matching error and an operation of updating the minimum matching error and the maximum matching error are ended, the optimal candidate block which is a candidate block having the minimum matching error is determined as a matching block, and a motion vector from the original block to the matching block is determined as the optimal motion vector indicating a motion between the first and second image frames. As described above, the minimum matching error and the maximum matching error are updated according to the determination of the optimal candidate block when sequentially calculating partial matching errors on a candidate block, and thus the calculation of partial matching errors on all candidate blocks is completed and simultaneously a matching block is determined.

In this way, when calculating a matching error between each candidate block and the original block for determining a matching block corresponding to the original block from among the candidate blocks of a search range, the fast motion estimation apparatus determines whether to exclude a candidate block by using two criterions, i.e., the minimum matching error and the maximum matching error, and thus can considerably decrease an amount of calculation compared to the existing PDE. Also, by adaptively controlling the size of the search range based on a matching error on adjacent candidate blocks, the fast motion estimation apparatus can more increase the speed of motion estimation.

Figure 4:
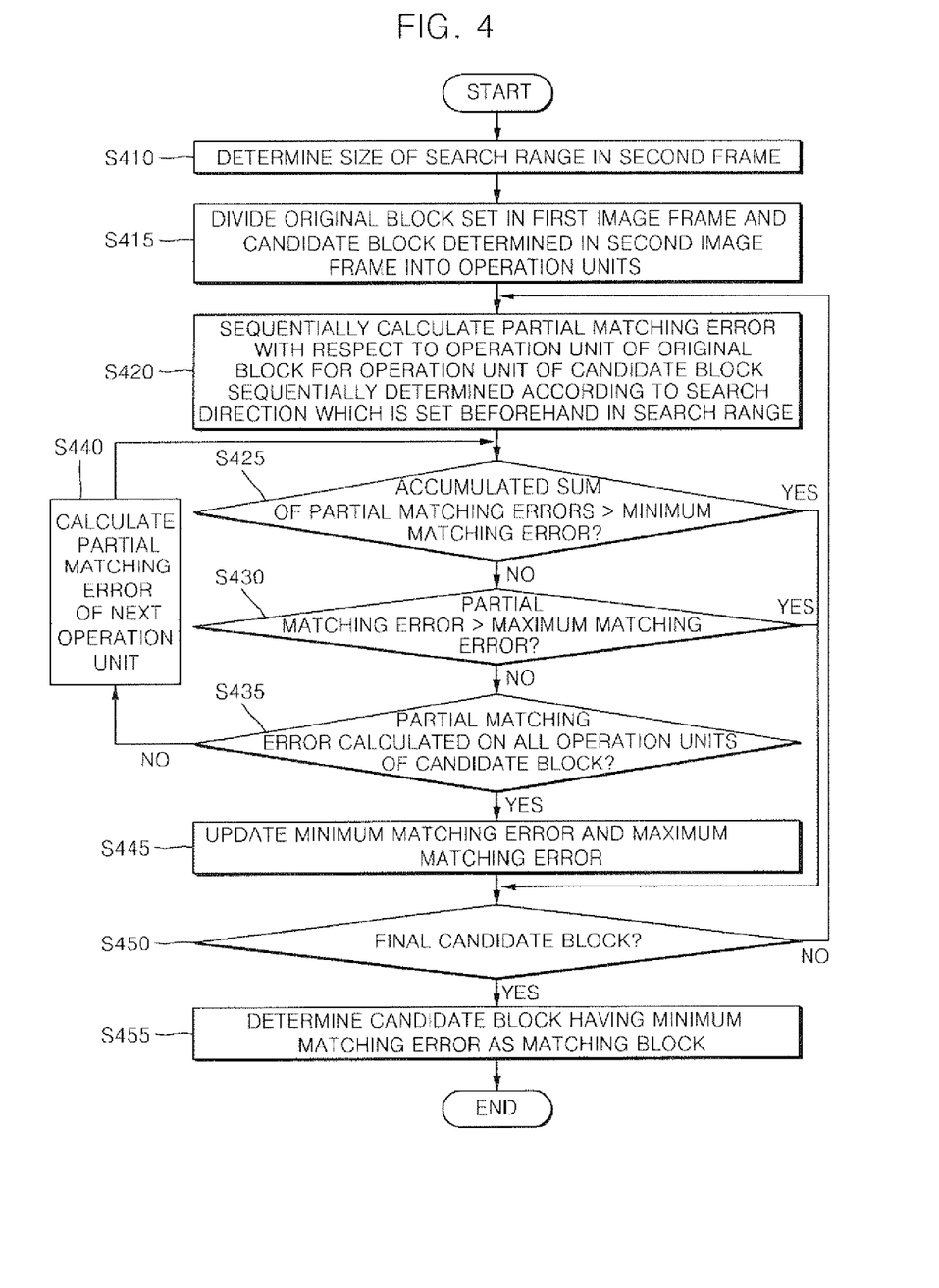
FIG. 4 is a flowchart illustrating a fast motion estimation method based on adaptive search range and partial matching error according to an exemplary embodiment.

FIG. 4 is a flowchart illustrating a fast motion estimation method based on adaptive search range and partial matching error according to an exemplary embodiment.

Referring to FIG. 4, the search range setting unit 110 first determines the median vector of vectors from the original block of a first image frame to neighboring blocks adjacent to the original block through the initial motion vector determiner 112. Subsequently, the absolute difference sum calculator 114 calculates the SAD between the initial candidate block that is determined on the basis of the initial motion vector in a second image frame and the original block for neighboring candidate blocks. Finally, the range size determiner 116 determines the size of a search range in the second image frame on the basis of the maximum value of SADs in operation 5410.

The block dividing unit 120 divides the original block and candidate blocks, which correspond to the original block and are sequentially determined according to a predetermined search direction in the search range, into a plurality of operation units configured with the same number of pixels in operation 5415. The matching error calculating unit 130 calculates a partial matching error being the SAD of a pixel value with respect to a pixel that configures the operation unit of the same position in the original block for respective operation units generated from respective candidate blocks in operation 5420. At this point, the foremost initial candidate block among sequentially-determined candidate blocks is temporarily determined as the optimal candidate block.

Whenever partial matching errors are calculated on the operation units of respective candidate blocks other than the initial candidate block the minimum matching error comparator 140 compares the accumulated sum of partial matching errors that are sequentially calculated on respective operation units and the minimum matching error which is the minimum value of the total sum of partial matching errors that are calculated on the optimal candidate block in operation S425. When the compared result shows that the accumulated sum is greater than the minimum matching error, the minimum matching error comparator 140 calculates partial matching errors on the operation units of sequentially-succeeded candidate blocks in operation S420.

When the accumulated sum is not greater than the minimum matching error, the maximum matching error comparator 150 compares a partial matching error that is calculated on each operation unit and the maximum value of partial matching errors that are calculated from the optimal candidate block in operation S430. When the compared result shows that the partial matching error is greater than the maximum matching error, the maximum matching error comparator 150 calculates partial matching errors on the operation units of sequentially-succeeded candidate blocks in operation S420.

When the partial matching error is not greater than the maximum matching error and a current operation unit is not the final operation unit of a current candidate block in operation 5435, the matching error calculating unit 130 calculates a partial matching error on a next operation unit in operation 5440, and operations S425 and 5430 are performed.

When the calculation of partial matching errors is completed up to the final operation unit of a candidate block, the matching error comparing unit 145 determines a corresponding candidate block as a new optimal candidate block and updates the minimum matching error and the maximum matching error in operation S445.

When all the above-described operations are sequentially performed up to the final candidate block of the search range in operation S450, the matching block determining unit 160 determines the optimal candidate block as a matching block for estimating a motion vector from the original block in operation S455.

An experiment has been performed for evaluating the performance of the fast motion estimation apparatus and method according to an exemplary embodiment. In the experiment, a variety of video sequences were used, and 300 image frames of about 30 Hz were included as the standard of QCIF. The information of respective video sequences is summarized and arranged in the following Table 1.

TABLE 1

| Number | Sequence | Motion | Number | Sequence | Motion |
|---|---|---|---|---|---|
| #1 | Akiyo | Static | #5 | News | Intermediate |
| #2 | Container | Static | #6 | Silent voice | Intermediate |
| #3 | Foreman | Large | #7 | Coast guard | Intermediate |
| #4 | Mobile | Large | #8 | Mother&dauter | Intermediate |

Referring to the Table 1, Foreman and Mobile include a large motion, and Akiyo and Container are almost a static sequence. The remaining four video sequences include an approximately intermediate motion.

In the experiment, a used search direction uses a spiral path, the size of the original block and the size of a candidate block are 16×16, and the size of a search range is ±7. Also, only a brightness component was used in the experiment. As initial setting, an SAD value was normalized by a block size, and a reference value "$T_{SAD}$" was set as 8 (8 per pixel).

First, an experiment for comparing the performance of the fast motion estimation apparatus and method according to an exemplary embodiment and the performances of the existing fast matching algorithms has been performed. As the existing algorithms used in the experiment, there are a PDE algorithm, a fast PDE algorithm (hereinafter referred to as SBPDE) based on adaptive matching scan by an aligned sub-block, a fast full search algorithm (hereinafter referred to as FFSSG) using alignment by gradient, a PDE algorithm (hereinafter referred to as PPDE) that compares the accumulated sum of partial SADs and the minimum SAD to determine a candidate block to be removed, and a controllable partial distortion search algorithm (hereinafter referred to as APDS) using a search window having a fixed size "D". Among these algorithms, APDS has experimented when D=3.

Among the existing algorithms, SBPDE and FFSSG require a calculation operation on the gradient and alignment of a pixel adjacent to a sub-block for each original block. However, only operations such as multiplication and addition were considered for simply comparing the costs for calculation. The following Table 2 lists the number of average times calculation is performed per each pixel in each algorithm and the fast motion estimation apparatus and method according to an exemplary embodiment. In the following Table 2, the maximum values are thickly emphasized among measured values obtained for each video sequence.

TABLE 2

| Sequence | Costs and Efficiencies (η) for Calculation Per Pixel | | | | |
|---|---|---|---|---|---|
| | PDE | SBPDE | FESSG | PPDE | APDS (D = 3) | Embodiment |
| #1 | 17.19 | 16.46 (4.23) | 15.77 (8.24) | 13.44 (21.79) | 4.15 (75.87) | 1.82 (89.43) |
| #2 | 31.82 | 26.18 (17.70) | 23.38 (26.52) | 15.54 (51.15) | 4.86 (84.74) | 1.94 (93.90) |
| #3 | 53.88 | 45.75 (15.10) | 41.93 (22.19) | 41.35 (23.26) | 7.38 (86.30) | 7.73 (85.65) |
| #4 | 46.68 | 39.87 (14.58) | 35.01 (25.00) | 30.46 (34.75) | 5.73 (87.72) | 11.74 (74.85) |
| #5 | 25.88 | 21.06 (18.61) | 19.50 (24.67) | 19.39 (25.08) | 5.02 (80.61) | 3.92 (84.84) |
| #6 | 27.75 | 27.23 (1.87) | 26.35 (5.03) | 21.34 (23.09) | 5.20 (81.26) | 4.73 (82.95) |
| #7 | 42.98 | 37.80 (12.04) | 34.68 (19.30) | 22.47 (47.72) | 5.42 (87.40) | 7.63 (82.24) |
| #8 | 41.35 | 34.18 (17.32) | 30.49 (26.25) | 20.77 (49.76) | 7.17 (82.65) | 2.93 (92.92) |
| Average | 35.94 | 31.07 (12.68) | 28.39 (19.65) | 23.10 (34.58) | 5.62 (83.32) | 5.31 (85.85) |

The existing algorithms in the Table 2 shows SAD calculation performance based on line or sub-block, but the fast motion estimation method according to an exemplary embodiment shows a result based on the maximum error limiting factor using a controlled search range. Numerals in parenthesis indicate calculation efficiency for the existing PDE algorithm and are defined as Equation (13) below.

$$\eta = \frac{PDE - CPDE}{PDE} \times 100 \quad (13)$$

where PDE is the calculating cost of the existing PDE, and CPDE is the calculating cost of an algorithm for comparison.

Referring to the Table 2, it can be seen that the fast motion estimation apparatus and method according to an exemplary embodiment decrease the costs for calculation by about 86%, 73%, 66%, 51% and 3% relative to the existing PDF, SBPDE, FFSSG, PPDE and APDS. APDS shows good performance for a few video sequences compared to the fast motion estimation apparatus and method according to an exemplary embodiment. This is because APDS replaces a given search range with a search range having a fixed size (D=3 in the experiment) and executes an algorithm in a small search window in recompense for the considerable decrease of image quality. On the other hand, the fast motion estimation apparatus and method according to an exemplary embodiment adaptively controls the original search range that may sufficiently include the accurate motion of an object.

A video sequence including complicated content affects the performance of SBPDE, but the fast motion estimation apparatus and method according to an exemplary embodiment are effective irrespective of the content of a scene. The fast motion estimation apparatus and method according to an exemplary embodiment show the content of a block in an alignment method. This is because such an approach is more effective for complicated sequences. Accordingly, an approach based on block alignment can improve the performance of the existing approach.

Figure 5:
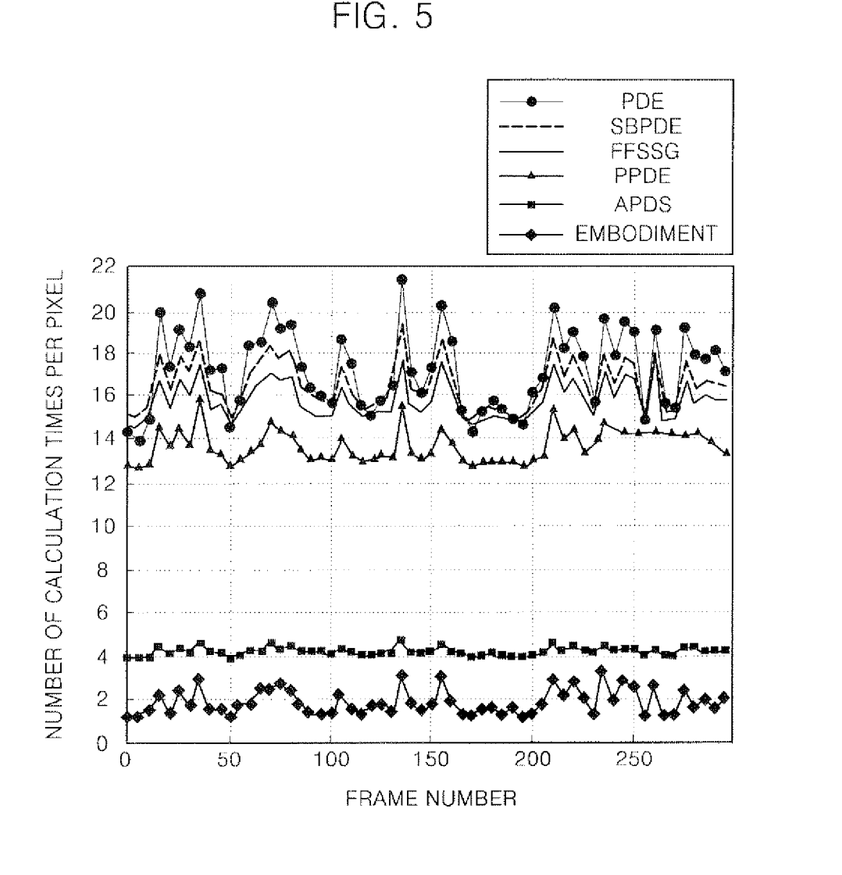
FIG. 5 is a graph showing the number of calculation times per pixel for each frame on #1 (i.e., an Akiyo video sequence) among video sequences in Table 1.

FIG. 5 is a graph showing the number of calculation times per pixel for each frame on #1 (i.e., an Akiyo video sequence) among the video sequences in the Table 1.

Referring to FIG. 5, it can be seen that the fast motion estimation apparatus and method according to an exemplary embodiment have the small number of calculation times and are stable compared to the existing algorithms.

The following Table 3 shows the performance of an exemplary embodiment as PSNR.

TABLE 3

| | PSNR[dB] (Difference) | | | |
|---|---|---|---|---|
| Sequence | PDE | PPDE | APDS | Embodiment |
| #1 | 44.296 | 44.296 (−0.0000) | 44.271 (−0.0252) | 44.290 (−0.0056) |
| #2 | 43.027 | 43.027 (−0.0002) | 42.875 (−0.1526) | 43.021 (−0.0066) |
| #3 | 32.064 | 32.063 (−0.0010) | 31.274 (−0.7896) | 32.026 (−0.0380) |
| #4 | 26.009 | 26.009 (−0.0000) | 25.983 (−0.0262) | 26.002 (−0.0072) |
| #5 | 36.235 | 36.235 (−0.0000) | 35.975 (−0.2599) | 36.162 (−0.0727) |
| #6 | 35.003 | 35.002 (−0.0001) | 34.522 (−0.4805) | 34.950 (−0.0527) |
| #7 | 32.483 | 32.482 (−0.0008) | 32.416 (−0.0670) | 32.482 (−0.0003) |
| #8 | 41.156 | 41.156 (−0.0000) | 41.048 (−0.1078) | 41.150 (−0.0059) |
| Average | 36.284 | 36.284 (−0.0003) | 36.045 (−0.2386) | 36.260 (−0.0236) |

Referring to the Table 3, the performances of PPDE, APDS and an exemplary embodiment are shown in comparison with the existing PDE algorithm, and it can be seen that the fast motion estimation apparatus and method according to an exemplary embodiment show the negligible deterioration of quality by about −0.02 dB and has the almost same quality as that of a PDE algorithm. Since APDS considerably reduces a given search range with no consideration of image content, the qualities of images are considerably deteriorated compared to other algorithms.

For more clearly comparing an exemplary embodiment and APDS, the performance of APDS where the size of a search range is not fixed and the performance of APDS having a controlled search range like an exemplary embodiment have been evaluated. The former shows the deterioration of image quality by about −0.0855 dB and 42% efficiency for calculation in comparison with the existing PDE, and the latter shows 77% efficiency for calculation but has deteriorated the qualities of images by about −0.0944 dB. Therefore, like an exemplary embodiment, the control of a search range based on the matching error of neighboring blocks can considerably decrease the cost for calculation even when being applied to the existing algorithm. In an exemplary embodiment, furthermore, although an operation of controlling a search range is excluded, 62% efficiency for calculation is shown in comparison with PDE. This denotes that a limiting factor itself by the maximum partial error may be a criterion efficient for last motion estimation.

An experiment has been made for comparing an exemplary embodiment with three-step search (hereinafter referred to as 3SS), four-step search (hereinafter referred to as 4SS) and new three-step search (hereinafter referred to as N3SS) in performance. Such algorithms are based on a method of decreasing the length of a given search path. The following Table 4 shows the compared result of the performances of an exemplary embodiment and the existing algorithms in aspects of the cost for calculation and visual quality.

6.5% but considerably deteriorates quality by about −1.843 dB. On the contrary, it can be seen that the fast motion estimation apparatus and method according to an exemplary embodiment require relative low cost for calculation and show the lowest deterioration of quality compared to the existing algorithms.

By controlling a search range on the basis of the information of adjacent blocks, the performance of the fast motion estimation apparatus and method according to an exemplary embodiment can be more improved. For example, the fast motion estimation apparatus and method can change the reference value of Equation (7) by using a weight function including the information of adjacent blocks. Also, the fast motion estimation apparatus and method may be combined with the existing fast search algorithm and applied to a fast video coding system.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

The fast motion estimation apparatus and method based on adaptive search range and partial matching error according to exemplary embodiments divide the original block and the

TABLE 4

| Sequence | | PDE | 3SS | 4SS | N3SS | Embodiment |
|---|---|---|---|---|---|---|
| #1 | C($\eta$) | 17.19 | 2.88 | 1.95 | 1.94 | 1.82 |
| | | | (83.25) | (88.65) | (88.70) | (89.43) |
| | PSNR($\Delta$) | 44.296 | 43.886 | 43.886 | 43.886 | 44.290 |
| | | | (−0.4096) | (−0.4096) | (−0.4096) | (−0.0056) |
| #2 | C($\eta$) | 31.82 | 3.44 | 2.21 | 2.22 | 1.94 |
| | | | (89.18) | (93.04) | (93.03) | (93.90) |
| | PSNR($\Delta$) | 43.027 | 42.884 | 42.875 | 42.868 | 43.021 |
| | | | (−0.1428) | (−0.1526) | (−0.1589) | (−0.0066) |
| #3 | C($\eta$) | 53.88 | 6.90 | 3.95 | 3.98 | 7.73 |
| | | | (87.19) | (92.67) | (92.62) | (85.65) |
| | PSNR($\Delta$) | 32.064 | 28.138 | 28.254 | 28.249 | 32.026 |
| | | | (−3.9258) | (−3.8098) | (−3.8146) | (−0.0380) |
| #4 | C($\eta$) | 46.68 | 5.68 | 3.35 | 3.35 | 11.74 |
| | | | (87.84) | (92.83) | (92.83) | (74.85) |
| | PSNR($\Delta$) | 26.009 | 25.709 | 25.709 | 25.709 | 26.002 |
| | | | (−0.2999) | (−0.2999) | (−0.2999) | (−0.0072) |
| #5 | C($\eta$) | 25.88 | 3.48 | 2.24 | 2.24 | 3.92 |
| | | | (86.56) | (91.34) | (91.35) | (84.84) |
| | PSNR($\Delta$) | 36.235 | 34.885 | 34.886 | 34.887 | 36.162 |
| | | | (−1.3502) | (−1.3485) | (−1.3481) | (−0.0727) |
| #6 | C($\eta$) | 27.75 | 3.71 | 2.35 | 2.37 | 4.73 |
| | | | (86.61) | (91.52) | (91.46) | (82.95) |
| | PSNR($\Delta$) | 35.003 | 32.534 | 32.618 | 32.622 | 34.950 |
| | | | (−2.4684) | (−2.3842) | (−2.3805) | (−0.0527) |
| #7 | C($\eta$) | 42.98 | 6.15 | 3.59 | 3.58 | 7.63 |
| | | | (85.68) | (91.65) | (91.67) | (82.24) |
| | PSNR($\Delta$) | 32.483 | 27.483 | 27.497 | 27.495 | 32.482 |
| | | | (−4.9996) | (−4.9851) | (−4.9877) | (−0.0003) |
| #8 | C($\eta$) | 41.35 | 3.85 | 2.42 | 2.43 | 2.93 |
| | | | (90.69) | (94.14) | (94.13) | (92.92) |
| | PSNR($\Delta$) | 41.156 | 39.779 | 39.804 | 39.800 | 41.150 |
| | | | (−1.3771) | (−1.3524) | (−1.3557) | (−0.0059) |
| Average | C($\eta$) | 35.94 | 4.51 | 2.76 | 2.76 | 5.31 |
| | | | (87.13) | (91.98) | (91.97) | (85.85) |
| | PSNR($\Delta$) | 36.284 | 34.412 | 34.441 | 34.440 | 36.260 |
| | | | (−1.8717) | (−1.8428) | (−1.8444) | (−0.0236) |

In the Table 4, C indicates cost for calculation per pixel, $\eta$ indicates efficiency for calculation, and $\Delta$ indicates a difference of a PSNR value with respect to an PDE algorithm.

Referring to the Table 4, among the existing algorithms, the 4SS requires low cost for calculation close to an average of candidate blocks into the operation units, compare the partial matching error calculated for each operation unit with the minimum matching error and the maximum matching error and determine a candidate block to be excluded in the motion estimation operation, thereby decreasing an amount of calculation and increasing the speed of motion estimation. Moreover, the fast motion estimation apparatus and method adaptively control the size of the search range on the basis of a matching error on adjacent candidate blocks, thereby reducing an amount of unnecessary calculation. Furthermore, the fast motion estimation apparatus and method realign pixels so as to include information on the original block or all the candidate blocks when generating the operation unit, and thus can improve the reliability of the maximum matching error to be compared with the partial matching error that is calculated from each operation unit.

Although the fast motion estimation apparatus and method based on adaptive search range and partial matching error have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A motion estimation apparatus comprising:
a block dividing unit dividing an original block which is set in a first image frame among a plurality of successive image frames and candidate blocks, which correspond to the original block and are sequentially determined according to a predetermined search direction in a search range which is set in a second image frame intended to estimate a motion between the first image frame and the second image frame, into a plurality of operation units comprising the same number of pixels, respectively;
a matching error calculating unit calculating a partial matching error which is a Sum of Absolute Difference (SAD) of a pixel value with respect to each pixel which configures the operation unit of the same position in the original block for respective operation units of the candidate blocks;
a matching error comparing unit replacing an optimal candidate block with a selected candidate block, when a total sum of partial matching errors calculated on all operation units of the selected candidate block which is sequentially selected from among the candidate blocks is less than a minimum matching error being the total sum of partial matching errors calculated on all operation units of the optimal candidate block, and a maximum value of the partial matching errors calculated on all the operation units of the selected candidate block is less than a maximum matching error being a maximum value of the partial matching errors calculated on all the operation units of the optimal candidate block; and
a matching block determining unit determining the optimal candidate block as a matching block for estimating a motion vector from the original block, when partial matching errors are sequentially calculated on all the candidate blocks,
wherein a candidate block which is initially set as the optimal candidate block is a candidate block which is selected from among the candidate blocks for the first time.

2. The motion estimation apparatus of claim 1, wherein when a partial matching error which is sequentially calculated on the operation units of the selected candidate block is greater than the maximum matching error, the matching error comparing unit calculates the partial matching error on operation units of sequentially-succeeded candidate blocks.

3. The motion estimation apparatus of claim 1, wherein when an accumulated sum of partial matching errors which are sequentially calculated on the operation units of the selected candidate block is greater than the minimum matching error, the matching error comparing unit calculates the partial matching error on operation units of sequentially-succeeded candidate blocks.

4. The motion estimation apparatus of claim 1, further comprising:
an initial motion vector determiner determining a median vector of vectors from the original block to neighboring blocks adjacent to the original block as an initial motion vector;
an absolute difference sum calculator calculating an SAD of a pixel value with respect to each pixel configuring the original block for an initial candidate block of a position which is moved by the initial motion vector from a position corresponding to the original block and neighboring candidate blocks adjacent to the initial candidate block, in the second image frame; and
a range size determiner determining a size of the search range in the second image frame on the basis of a maximum value of SADs which are respectively calculated on the neighboring candidate blocks and the initial candidate block.

5. The motion estimation apparatus of claim 4, wherein the range size determiner determines the size of the search range through Equation below, $$f(\chi) = \max\left(0, \min\left(R, \text{round}\left(\frac{R \cdot \max(C)}{T_{SAD}}\right)\right)\right)$$

where D is the size of the search range determined by the range size determiner, R is the size of a search range which is initially set, round (•) is a function of changing the closest integer value, C is a set of SADs which are respectively calculated on the initial candidate block and the neighboring candidate blocks, and $T_{SAD}$ is a reference value which is set in advance for controlling the size of the search range.

6. The motion estimation apparatus of claim 1, wherein the operation unit of the original block and the operation unit of the candidate block are sub-blocks comprising pixels which correspond to the same position selected from respective unit blocks which have the same size and are generated by dividing the original block and the candidate block.

7. The motion estimation apparatus of claim 1, wherein the matching error comparing unit compares a partial matching error of a candidate block which is sequentially selected according to the search direction and the partial matching error of the optimal candidate block.

8. The motion estimation apparatus of claim 1, wherein the search direction is a spiral path from a center of the search range to an edge of the search range.

9. A motion estimation method comprising:
dividing an original block which is set in a first image frame among a plurality of successive image frames and candidate blocks, which correspond to the original block and are sequentially determined according to a predetermined search direction in a search range which is set in a second image frame intended to estimate a motion between the first image frame and the second image frame, into a plurality of operation units comprising the same number of pixels, respectively;

calculating a partial matching error which is a Sum of Absolute Difference (SAD) of a pixel value with respect to each pixel which configures the operation unit of the same position in the original block for respective operation units of the candidate blocks;

replacing an optimal candidate block with a selected candidate block, when a total sum of partial matching errors calculated on all operation units of the selected candidate block which is sequentially selected from among the candidate blocks is less than a minimum matching error being the total sum of partial matching errors calculated on all operation units of the optimal candidate block, and a maximum value of the partial matching errors calculated on all the operation units of the selected candidate block is less than a maximum matching error being a maximum value of the partial matching errors calculated on all the operation units of the optimal candidate block; and determining the optimal candidate block as a matching block for estimating a motion vector from the original block, when partial matching errors are sequentially calculated on all the candidate blocks, wherein a candidate block which is initially set as the optimal candidate block is a candidate block which is selected from among the candidate blocks for the first time.

10. The motion estimation method of claim 9, wherein the replacing of an optimal candidate block calculates the partial matching error on operation units of sequentially-succeeded candidate blocks, when a partial matching error which is sequentially calculated on the operation units of the selected candidate block is greater than the maximum matching error.

11. The motion estimation method of claim 9, wherein the replacing of an optimal candidate block calculates the partial matching error on operation units of sequentially-succeeded candidate blocks, when an accumulated sum of partial matching errors which are sequentially calculated on the operation units of the selected candidate block is greater than the minimum matching error.

12. The motion estimation method of claim 9, wherein before the dividing of an original block, the motion estimation method further comprises:

determining a median vector of vectors from the original block to neighboring blocks adjacent to the original block as an initial motion vector;

calculating an SAD of a pixel value with respect to each pixel configuring the original block for an initial candidate block of a position which is moved by the initial motion vector from a position corresponding to the original block and neighboring candidate blocks adjacent to the initial candidate block, in the second image frame; and determining a size of the search range in the second image frame on the basis of a maximum value of SADs which are respectively calculated on the neighboring candidate blocks and the initial candidate block.

13. The motion estimation method of claim 12, wherein the determining of a size determines the size of the search range through Equation below, $$f(\chi) = \max\left(0, \min\left(R, \text{round}\left(\frac{R \cdot \max(C)}{T_{SAD}}\right)\right)\right)$$

where D is the size of the search range determined by the range size determiner, R is the size of a search range which is initially set, round (•) is a function of changing the closest integer value, C is a set of SADs which are respectively calculated on the initial candidate block and the neighboring candidate blocks, and $T_{SAD}$ is a reference value which is set in advance for controlling the size of the search range.

14. The motion estimation method of claim 9, wherein the operation unit of the original block and the operation unit of the candidate block are sub-blocks comprising pixels which correspond to the same position selected from respective unit blocks which have the same size and are generated by dividing the original block and the candidate block.

15. The motion estimation method of claim 9, wherein the replacing of an optimal candidate block compares a partial matching error of a candidate block which is sequentially selected according to the search direction and the partial matching error of the optimal candidate block.

16. The motion estimation method of claim 9, wherein the search direction is a spiral path from a center of the search range to an edge of the search range.

17. A non-transitory computer-readable media having recorded thereon a program for executing the motion estimation method of claim 9 in the computer.

* * * * *